US012693400B2

(12) United States Patent
Ho

(10) Patent No.: US 12,693,400 B2
(45) Date of Patent: Jul. 28, 2026

(54) METHOD AND DEVICE FOR ALIGNING RADAR OF VEHICLE

(71) Applicant: HL KLEMOVE CORP., Incheon (KR)

(72) Inventor: Jong Un Ho, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 341 days.

(21) Appl. No.: 18/384,327

(22) Filed: Oct. 26, 2023

(65) Prior Publication Data

US 2024/0142598 A1 May 2, 2024

(30) Foreign Application Priority Data

Oct. 26, 2022 (KR) ........................ 10-2022-0139148

(51) Int. Cl.
*G01S 13/46* (2006.01)
*G01S 13/931* (2020.01)

(52) U.S. Cl.
CPC ............ *G01S 13/46* (2013.01); *G01S 13/931* (2013.01)

(58) Field of Classification Search
CPC ...... G01S 13/46; G01S 13/931; G01S 7/4034; G01S 7/403; G01S 7/4086; G01S 2013/93271; G01C 15/12; G01C 9/00; B60R 11/00; G01B 11/26; G06F 17/11
See application file for complete search history.

(56) References Cited

U.S. PATENT DOCUMENTS

| | | | | |
|---|---|---|---|---|
| 6,363,619 | B1* | 4/2002 | Schirmer | G01M 11/067 |
| | | | | 33/600 |
| 6,476,760 | B1* | 11/2002 | Winter | G01S 13/48 |
| | | | | 342/149 |
| 6,636,172 | B1* | 10/2003 | Prestl | G01S 7/4026 |
| | | | | 342/174 |
| 2002/0105456 | A1* | 8/2002 | Isaji | G01S 7/4026 |
| | | | | 342/174 |

FOREIGN PATENT DOCUMENTS

| | | |
|---|---|---|
| JP | 2003-506722 | 2/2003 |
| JP | 2021-139852 | 9/2021 |
| KR | 10-2014-0135410 | 11/2014 |

OTHER PUBLICATIONS

Office Action dated Dec. 20, 2024 for Korean Patent Application No. 10-2022-0139148 and its English translation by Google Translate.

* cited by examiner

*Primary Examiner* — Yonghong Li
(74) *Attorney, Agent, or Firm* — WOMBLE BOND DICKINSON (US) LLP

(57) ABSTRACT
A vehicle radar alignment method and device may perform precise alignment of a radar mounted to a vehicle by enhancing the accuracy of determination of the mounting angle of the radar for aligning the radar mounted to the vehicle, in particular, vertical angle estimation, and may enhance the accuracy of vertical angle estimation of the radar mounted to the vehicle even when the vertical beam (Continued)

pattern of the radar is asymmetric to a left and/or right due to a hardware error or mechanical defect in the process of designing the radar.

20 Claims, 9 Drawing Sheets

FIG.8 start receive first to third reflection signals ~S810 configure steering vector based on first reflection signal ~S821 extract first intensity of second reflection signal and second intensity of third reflection signal based on steering vector ~S823

S833~ estimate horizontal angle estimate vertical angle ~S831 determine mounting angle and adjustment angle ~S841 control to adjust radar mounting position ~S843 end

METHOD AND DEVICE FOR ALIGNING RADAR OF VEHICLE

CROSS-REFERENCE TO RELATED APPLICATION

This application claims priority from Korean Patent Application No. 10-2022-0139148, filed on Oct. 26, 2022, which is hereby incorporated by reference for all purposes as if fully set forth herein.

BACKGROUND

Technical Field

Embodiments of the present disclosure generally relate to a vehicle radar alignment method and device.

Description of Related Art

Recently, various control systems for controlling steering, velocity, braking, parking, and the like are being applied to vehicles. Such a control systems require various sensors for sensing vehicle dynamics information, such as a velocity sensor and a steering angle sensor, and an object recognition sensor, such as a radar device, capable of recognizing objects, such as nearby vehicles and pedestrians.

Therefore, to accurately perform the control of the vehicle by such a control systems, accuracy of object recognition results through a radar device is a prerequisite. The accuracy of the object recognition result may be significantly affected by the alignment of the radar device.

In other words, to enhance the accuracy of the object recognition result by the radar device, after the radar is mounted to the vehicle in the vehicle production stage, the alignment of the radar device is performed to correct the alignment error during the mounting process of the radar device and, even after the vehicle is shipped out, if an alignment error of the radar device occurs due to, for example, external impact, the alignment of the radar device needs to be performed.

Meanwhile, to perform the alignment of the radar device, the alignment error of the radar device, that is, the mounting angle of the radar device, needs to be determined first. Therefore, it is necessary to enhance the accuracy of determining the mounting angle of the radar device for precise alignment of the radar device.

BRIEF SUMMARY

Some embodiments of the present disclosure may provide a vehicle radar alignment method and device capable of performing precise alignment of a radar mounted to a vehicle by enhancing the accuracy of determination of the mounting angle of the radar for aligning the radar mounted to the vehicle, in particular, vertical angle estimation.

Certain embodiments of the present disclosure may also provide a vehicle radar alignment method and device capable of enhancing the accuracy of vertical angle estimation of a radar mounted to a vehicle even when the vertical beam pattern of the radar is asymmetric to a left and/or right due to a hardware error or mechanical defect in the process of designing the radar.

In an aspect, some embodiments of the present disclosure may provide a vehicle radar alignment method comprising a receiving step of receiving a first reflection signal, a second reflection signal, and a third reflection signal for a state in which a vertical angle of a test target is aligned at 0°, a state in which the vertical angle is tilted at −θ°, and a state in which the vertical angle is tilted at +θ° based on a radar mounted to a vehicle, a signal processing step of determining a steering vector based on the first reflection signal and extracting a first intensity in the second reflection signal and a second intensity in the third reflection signal based on the steering vector, and an estimating step of producing a first coefficient, a second coefficient, and a third coefficient based on a first section, a second section, and a third section of a preset calibration vertical beam pattern, selecting one of the first coefficient to the third coefficient based on the first intensity and the second intensity, and estimating a vertical angle of the radar mounted to the vehicle based on the selected coefficient.

In another aspect, certain embodiments of the present disclosure may provide a vehicle radar alignment device comprising a receiver receiving a first reflection signal, a second reflection signal, and a third reflection signal for a state in which a vertical angle of a test target is aligned at 0°, a state in which the vertical angle is tilted at −θ°, and a state in which the vertical angle is tilted at +θ° based on a radar mounted to a vehicle, a signal processor determining a steering vector based on the first reflection signal and extracting a first intensity in the second reflection signal and a second intensity in the third reflection signal based on the steering vector, and an estimator producing a first coefficient, a second coefficient, and a third coefficient based on a first section, a second section, and a third section of a preset calibration vertical beam pattern, selecting one of the first coefficient to the third coefficient based on the first intensity and the second intensity, and estimating a vertical angle of the radar mounted to the vehicle based on the selected coefficient.

BRIEF DESCRIPTION OF DRAWINGS

The above and other objects, features, and advantages of the disclosure will be more clearly understood from the following detailed description, taken in conjunction with the accompanying drawings, in which:

FIG. 8 is a flowchart for illustrating a method for aligning a radar of a vehicle according to an embodiment of the present disclosure.

DETAILED DESCRIPTION OF EMBODIMENTS

Figure 1:
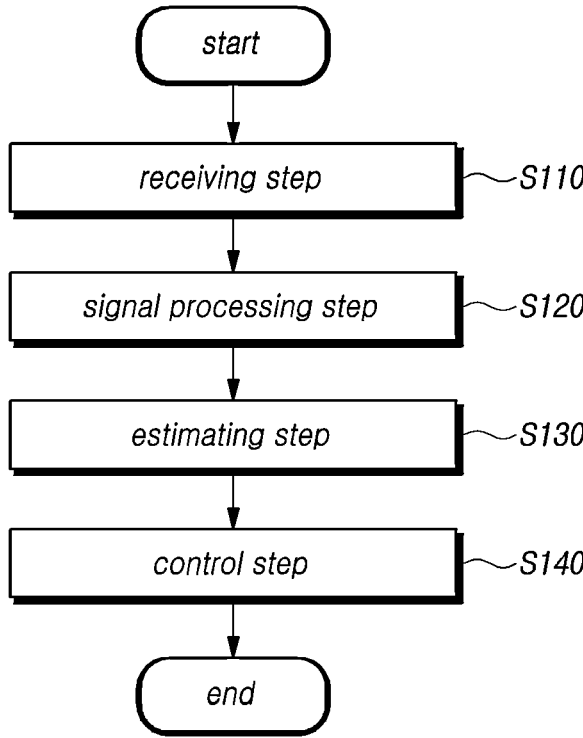
FIG. 1 is a flowchart for illustrating a method for aligning a radar of a vehicle according to an embodiment of the present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
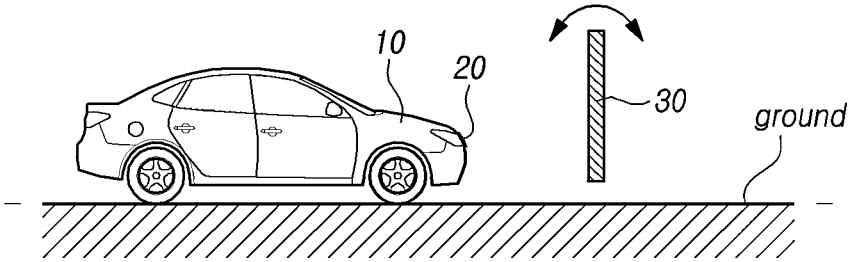
FIG. 2 is a conceptual view for illustrating an example of test environment for estimating an angle for a radar in a method for aligning a radar of a vehicle according to an embodiment of the present disclosure.

FIG. 1 is a flowchart for illustrating a method for aligning a radar of a vehicle according to an embodiment of the present disclosure. FIG. 2 is a conceptual view for illustrating an example of test environment for estimating an angle for a radar in a method for aligning a radar of a vehicle according to an embodiment of the present disclosure.

Referring to FIG. 1, a method for aligning a radar of a vehicle according to an embodiment of the present disclosure may include a receiving step S110 of receiving a first reflection signal for a state in which a vertical angle of a test target is aligned at a reference angle (such as 0°), a second reflection signal a state in which the vertical angle is tilted at a predetermined negative angle (hereinafter "−θ°"), and a third reflection signal for a state in which the vertical angle is tilted at a predetermined positive angle (hereinafter "+θ°"), based on a radar mounted to a vehicle.

Referring to FIG. 2, to estimate the angle of a radar 20 mounted on or to the vehicle 10, a test target 30 is positioned to be spaced apart by a preset distance in front of the radar 20 mounted on or to the vehicle 10.

The radar 20 may be mounted to the vehicle 10. The radar 20 may be mounted inside the vehicle 10 to face forward of the vehicle 10. However, the position where the radar 20 is mounted is not limited to the front of the vehicle 10, and the vehicle 10 may further include one or more of a left-side radar, a right-side radar, and a rear-side radar in addition to the front radar 20.

The radar 20 may transmit a generated signal to the outside of the vehicle 10 and receive a reflection signal which is the reflection of the transmitted signal by a target. The radar 20 may detect a distance to the target by analyzing a time from the transmission of the radar signal to the receipt of the radar signal reflected by the target and returned and a change in the signal waveform. The radar 20 may be implemented as, for instance, a frequency modulation continuous wave radio detection and ranging (FMCW) radar, but is not limited thereto. In other words, the radar 20 may include any information system that detects the target by measuring the reflection signal of the electromagnetic wave which is reflected by the target and returns to the radar, and determines, for example, but not limited to, a direction, distance, and velocity of the signal, regardless of the format of the transmitted signal.

Further, the radar 20 may generate a map for the detected ambient targets as well as distance detection. The map may indicate positions of targets around the vehicle 10, changes in the positions of the targets, and the like. The target may be a dynamic object or a static object. For example, the dynamic object may be another vehicle, a bicycle, a motorcycle, a person, or the like, that is moving around the host vehicle, and the static object may be another vehicle, a bicycle, or a motorcycle that is parked around the host vehicle or a person that is not moving, a guardrail, a traffic light, or the like.

The radar 20 may include a plurality of antennas. For example, the radar 20 may include at least one transmission antenna and a plurality of reception antennas corresponding to a plurality of reception channels. The reflection signals received through the reception channels may have different phases depending on the reception directions, and the reception antennas may have different directional angles.

The test target 30 may be provided in front of the radar 20 mounted to the vehicle 10.

The test target 30 may be provided with a tilting device, and the vertical angle of the test target 30 may be varied by the tilting device of the test target 30. The vertical angle of the test target 30 may mean an angle formed by a normal perpendicular to the ground and a reflective surface of the test target 20.

For example, the state in which the test target 30 is aligned at a reference angle (e.g. a vertical angle of 0°) may mean a case in which the reflective surface of the test target 30 is parallel to a normal perpendicular to the ground. The state in which the test target 30 is tilted at a predetermined negative angle (e.g. a vertical angle −θ°) may be a case in which the reflective surface of the test target 30 is tilted counterclockwise to θ° with respect to the normal perpendicular to the ground. The state in which the test target 30 is tilted at a predetermined positive angle (e.g. a vertical angle +θ°) may mean a case in which the reflective surface of the test target 30 is tilted at θ° clockwise with respect to the normal perpendicular to the ground.

The test target 30 may have a flat reflector. Since the flat plate reflector reflects the incident signal in the opposite direction of the same angle as the incident angle, the radar 20 may receive only the reflection signal that is incident perpendicular to the flat plate reflector.

In other words, the receiving step S110 may receive each of the first reflection signal that is vertically incident and reflected with respect to the state in which the vertical angle of the test target 30 is aligned at 0°, the second reflection signal that is vertically incident and reflected with respect to the state in which the test target 30 is tilted at −θ°, and the third reflection signal that is vertically incident and reflected with respect to the state in which the test target 30 is tilted at +θ°, based on the radar 20 mounted to the vehicle 10.

Referring to FIG. 1, the method for aligning the radar of the vehicle according to an embodiment of the present disclosure includes a signal processing step S120 of determining a steering vector based on the first reflection signal and extracting a first intensity from the second reflection signal and a second intensity from the third reflection signal based on the steering vector.

The signal processing step S120 may determine the steering vector based on the first reflection signal.

For example, the steering vector may be determined based on the first reflection signal for the state in which the vertical angle of the test target 30 is aligned at 0° based on the radar 20 mounted to the vehicle 10. The steering vector may be determined by producing or calculating a difference between the phases of the first reflection signals received through the reception antennas of the radar 20 and a reference phase. The reference phase may be, for example, but not limited to, a phase preset for a central antenna among the reception antennas of the radar 20, or a phase preset for any one antenna other than the central antenna among the reception antennas of the radar 20. The steering vector may be determined with phase values corresponding to the reception antennas included in the radar 20.

The steering vector may include information about the horizontal angle of the radar 20. In other words, the steering vector may include horizontal angle information due to an alignment error of the radar 20 in the horizontal direction. Accordingly, the steering vector may be used to estimate the horizontal angle of the radar 20 to be described below, and may be also used to estimate the vertical angle to enhance the accuracy of the vertical angle estimation.

The signal processing step S120 may extract the first intensity from the second reflection signal and the second intensity from the third reflection signal based on the steering vector.

For example, the signal processing step S120 may extract the first intensity of the maximum point by calculating the second reflection signal for the state in which the vertical angle between the steering vector and the test target is tilted at −θ°. Also, the signal processing step S120 may extract the second intensity of the maximum point by calculating the third reflection signal for the state in which the vertical angle between the steering vector and the test target is tilted at +θ°.

As described above, since the steering vector includes information about the horizontal angle of the radar 20, the converted second reflection signal and the converted third reflection signal for the case where there is no error in the horizontal angle of the radar 20 may be produced through calculation with the steering vector for each of the second reflection signal and the third reflection signal, and the first intensity and the second intensity may be extracted based on the converted second reflection signal and the converted third reflection signal, respectively. Accordingly, since the first intensity and the second intensity are used to estimate the vertical angle of the radar 20 mounted to the vehicle 10 without influence by the horizontal angle error, the accuracy of estimating the vertical angle of the radar 20 mounted to the vehicle 10 may be enhanced.

Referring to FIG. 1, the method for aligning the radar of the vehicle according to the present embodiments includes an estimating step (S130) of producing a first coefficient, a second coefficient, and a third coefficient based on a first section, a second section, and a third section of a preset calibration vertical beam pattern, selecting one of the first coefficient to the third coefficient based on the first intensity and the second intensity, and estimating a vertical angle of the radar mounted to the vehicle based on the selected coefficient.

The calibration vertical beam pattern may mean the intensity of the reflection signal based on the radar 20 before mounted to the vehicle 10, indicated for each vertical orientation.

The calibration vertical beam pattern based on the radar 20 before mounted to the vehicle 10 may be obtained using a flat plate reflector. However, the present disclosure is not limited thereto. For example, the calibration vertical beam pattern based on the radar 20 before mounted to the vehicle 10 may be obtained using a corner reflector.

There is a difference in that the flat plate reflector is a surface target and the corner reflector is a point target. Accordingly, the beam pattern shape of the corner reflector may be similar to the beam pattern shape of the flat plate reflector, but there may be a difference in intensity according to the difference in reflected power. According to an embodiment of the present disclosure, the vertical angle of the radar 20 mounted to the vehicle 10 may be estimated without using a factor related to the difference in intensity due to the difference in reflected power. Accordingly, the present embodiments may estimate the vertical angle of the radar 20 mounted to the vehicle 10 based not only on the calibration vertical beam pattern obtained using the flat plate reflector, but also on the calibration vertical beam pattern obtained using the corner reflector.

The calibration vertical beam pattern may have a left vertical beam pattern and a right vertical beam pattern asymmetric with each other with respect to the radar vertical angle of 0°. However, the present embodiments may also be applied to a vertical beam pattern that has a left vertical beam pattern and a right vertical beam pattern symmetrical with each other with respect to the radar vertical angle of 0°.

In the calibration vertical beam pattern, a first section, a second section, and a third section may be preset. For example, a portion of the left vertical beam pattern and a portion of the right vertical beam pattern may be set as the second section according to a preset angular range, a remaining portion of the left vertical beam pattern may be set as the first section, and a remaining portion of the right vertical beam pattern may be set as the third section.

The preset angular range may be set to differ depending on the asymmetry of the calibration vertical beam pattern. For example, the preset angular range may be set to a narrower range as the asymmetry of the calibration vertical beam pattern increases, and may be set to a wider range as the asymmetry of the calibration vertical beam pattern decreases.

The estimating step S130 may produce a first coefficient, a second coefficient, and a third coefficient based on the first section, the second section, and the third section of the preset calibration vertical beam pattern. For example, the estimating step may estimate each of a first quadratic equation for the first section, a second quadratic equation for the second section, and a third quadratic equation for the third section. In this case, a quadratic term coefficient of the first quadratic equation may be produced as the first coefficient, a quadratic term coefficient of the second quadratic equation may be produced as the second coefficient, and a quadratic term coefficient of the third quadratic equation may be produced as the third coefficient.

Further, the estimating step S130 may select one of the first to third coefficients based on the first intensity and the second intensity extracted in the signal processing step. For example, the estimating step may select one of the first to third coefficients based on a result of comparing a reference value preset based on a positive value γ and a difference between the first intensity and the second intensity.

For example, the estimating step S130 may select the first coefficient from among the first to third coefficients when the difference between the first intensity and the second intensity is less than a reference value −γ. As another example, the estimating step S130 may select the second coefficient from among the first to third coefficients when an absolute value of the difference between the first intensity and the second intensity is the reference value γ or less. As another example, the estimating step S130 may select the third coefficient from among the first to third coefficients when the difference between the first intensity and the second intensity exceeds the reference value γ.

The estimating step S130 may estimate the vertical angle of the radar 20 mounted to the vehicle 10 based on the selected coefficient. In other words, the estimating step S130 may estimate a different vertical angle of the radar 20 mounted to the vehicle 10 depending on the selected coefficient.

Further, the estimation step S130 may estimate a horizontal angle of the radar 20 mounted to the vehicle 10 based on the steering vector determined in the signal processing step S120. For example, the estimating step S130 may estimate the horizontal angle of the radar 20 mounted to the vehicle 10 by comparing the determined steering vector with a preset reference steering vector. However, the horizontal angle of the radar 20 mounted to the vehicle 10 may be estimated based on a conventional technique of estimating the steering vector.

Referring to FIG. 1, the method for the radar of the vehicle according to an embodiment of the present disclosure may further include a control step S140 of determining a mounting angle of the radar 20 mounted to the vehicle 10 based on the vertical angle and the horizontal angle of the radar 20 estimated in the estimation step S130, determining an adjustment angle for zeroing based on the mounting angle of the radar 20, and controlling to adjust a position of the radar 20 mounted to the vehicle 10 according to the adjustment angle.

The control step S140 may control the position of the radar 20 mounted to the vehicle 10 to be adjusted by operating the motor operably connected to the radar 20 for adjusting the mounting angle in which the radar 20 is mounted according to the adjustment angle for zeroing. However, the control step S410 may output a command or message for the adjustment angle for zeroing, allowing the radar 20 mounted to the vehicle 10 to be repositioned.

The method for aligning the radar of the vehicle according to an embodiment of the present disclosure may perform precise alignment of a radar mounted to a vehicle by enhancing the accuracy of determination of the mounting angle for aligning the radar mounted to the vehicle, in particular, vertical angle estimation.

The method for aligning a radar of a vehicle according to an embodiment of the present disclosure may enhance the accuracy of vertical angle estimation of a radar mounted to a vehicle even when the vertical beam pattern of the radar is asymmetric to a left and/or right due to a hardware error or mechanical defect in the process of designing the radar.

Figure 3:
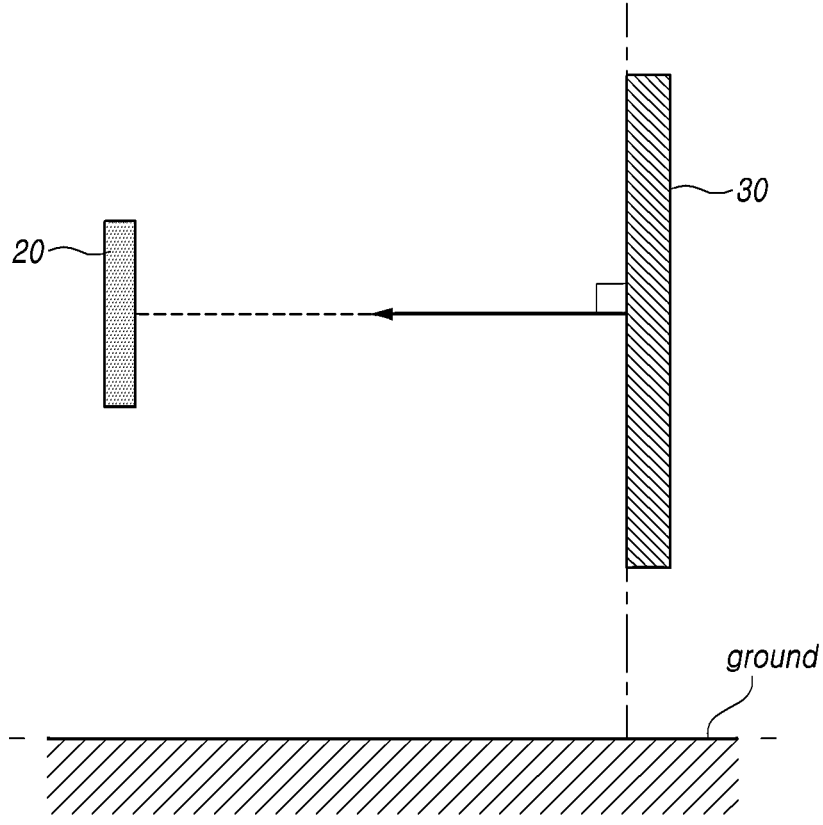
FIGS. 3 to 5 are views illustrating examples of signals associated with a radar according to a vertical angle of a test target in a method for aligning a radar of a vehicle according to an embodiment of the present disclosure.
Figure 4:
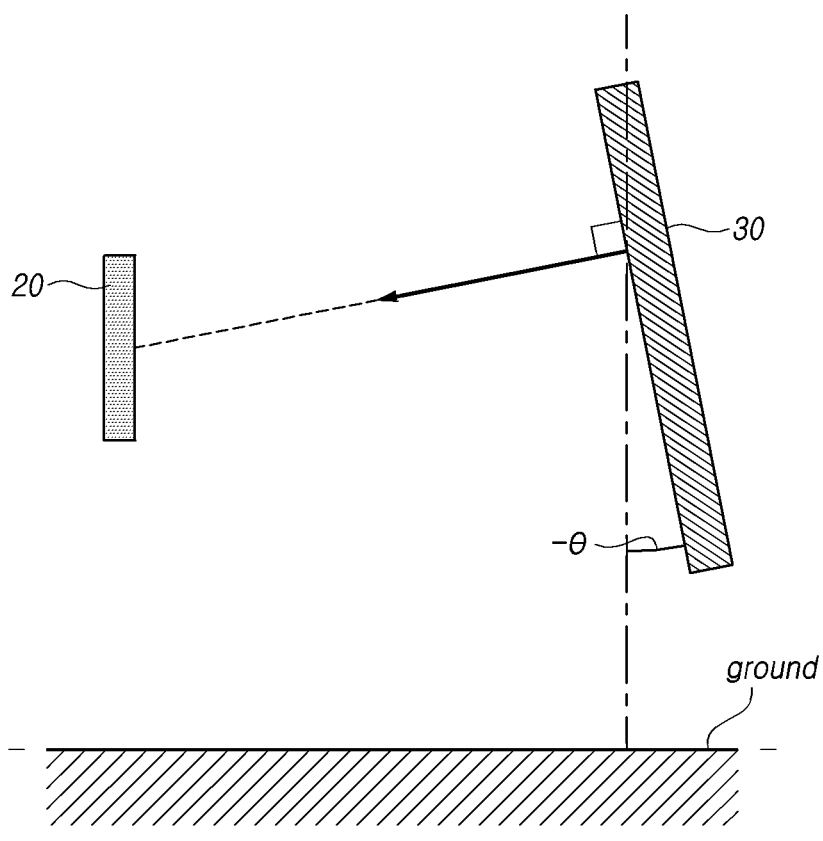
Figure 5:
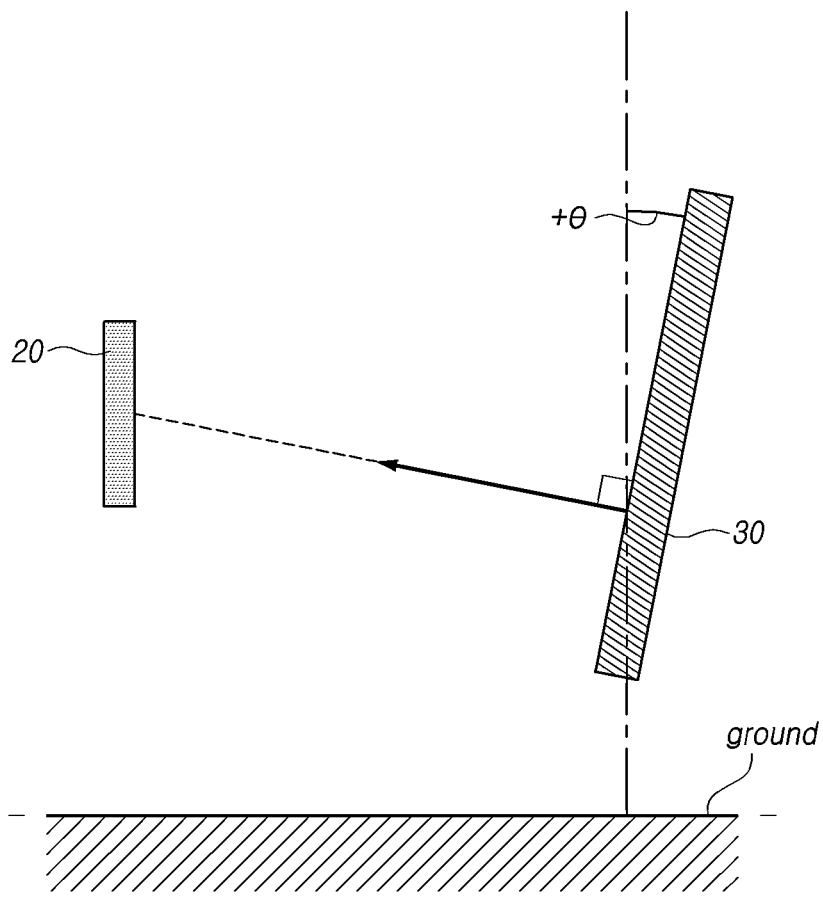

FIGS. 3 to 5 are views illustrating examples of signals associated with a radar according to a vertical angle of a test target in a method for aligning a radar of a vehicle according to an embodiment of the present disclosure.

FIG. 3 illustrates a transmission signal and a first reflection signal for a state in which the vertical angle of the test target 30 is aligned at 0° with respect to the radar 20 mounted to the vehicle 10, FIG. 4 illustrates a transmission signal and a second reflection signal for a state in which the vertical angle of the test target 30 is tilted at −θ° with respect to the radar 20 mounted to the vehicle 10, and FIG. 5 illustrates a transmission signal and a third reflection signal for a state in which the vertical angle of the test target 30 is tilted at +θ° with respect to the radar 20 mounted to the vehicle 10.

As described above, the test target 30 may be a flat plate reflector. When the flat plate reflector is used as the test target 30, the radar 20 receives only the reflected signal of the signal vertically incident on the test target 30.

As illustrated in FIGS. 3 to 5, as the vertical angle of the test target 30 is changed, the angle between a portion of the test target 30 reflecting the vertically incident signal and the radar 20 is changed. Accordingly, while the signal transmitted from the radar 20 is reflected by the test target 30 and returned to the radar 20, the intensity of the signal is changed according to the attenuation of the antenna gain pattern, so that the intensity of the reflected signal received by the radar 20 is changed. For example, the intensity of the signal received by the radar 20 may decrease when the angle between the portion of the test target 30 reflecting the vertically incident signal and the radar 20 increases, and may increase when the angle between the portion of the test target 30 reflecting the vertically incident signal and the radar 20 decreases.

The first reflection signal may be used to determine the steering vector and estimate the horizontal angle of the radar 20 mounted to the vehicle 10, and the second reflection signal and the third reflection signal may be used to estimate the vertical angle of the radar 20 mounted to the vehicle 10.

Figure 6:
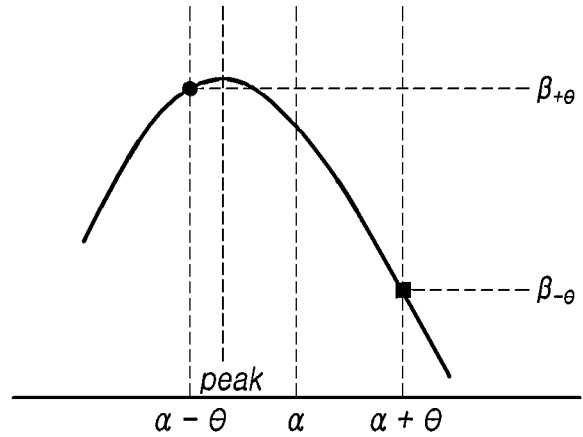
FIG. 6 is a graph for schematically illustrating a vertical angle estimation principle of a method for aligning a radar of a vehicle according to an embodiment of the present disclosure.

FIG. 6 is a graph for schematically illustrating a vertical angle estimation principle of a method for aligning a radar of a vehicle according to an embodiment the present disclosure.

The graph of FIG. 6 shows an example of a portion of a preset calibration vertical beam pattern.

In the example of the calibration vertical beam pattern, the first intensity extracted from the second reflection signal for the state in which the vertical angle of the test target is tilted at −θ° with respect to the radar mounted to the vehicle may match $\beta_{+\theta}$, and the second intensity extracted from the third reflection signal for the state in which the vertical angle of the test target is tilted at +θ° may match $\beta_{-\theta}$. Hereinafter, the first intensity is described as $\beta_{+\theta}$ and the second intensity is described as $\beta_{-\theta}$.

In FIG. 6, a may represent the vertical angle of the radar mounted to the vehicle to be estimated. If the vertical angle α of the radar mounted to the vehicle is estimated, the adjustment angle may be determined based on a difference between the vertical angle α and the vertical maximum intensity angle peak.

The calibration vertical beam pattern may be estimated by the quadratic equation of Equation 1 below.

$$y = ax^2 + c$$ [Equation 1]

By substituting ($\alpha$–$\theta$, $\beta$+$\theta$) and ($\alpha$+$\theta$, $\beta$–$\theta$) into Equation 1, the vertical angle $\alpha$ of the radar mounted to the vehicle may be estimated by Equation 2 below.

$$\alpha = \frac{\beta_{-\theta} - \beta_{+\theta}}{4a\theta}$$ [Equation 2]

Only the quadratic term coefficient a of Equation 1 is used to estimate the vertical angle $\alpha$ of the radar mounted to the vehicle according to Equation 2. However, when the left and right sides of the calibration vertical beam pattern are symmetrical, the estimation error may be not large even when the quadratic term coefficient a in Equation 1 is used. However, when the left and right sides of the calibration vertical beam pattern are asymmetric, the left and right patterns appear as different. Therefore, as the asymmetry in the calibration vertical beam pattern increases, the estimation error of the vertical angle $\alpha$ of the radar mounted to the vehicle may increase. In particular, as the absolute angle value increases, the slope of the beam pattern may increase, and thus the estimation error of the vertical angle $\alpha$ may also increase.

Meanwhile, the method for aligning the radar of the vehicle according to an embodiment of the present disclosure may enhance the accuracy of estimating the vertical angle $\alpha$ of the radar mounted to the vehicle, not only when the left and right sides of the calibration vertical beam pattern are symmetrical, but also when the left and right sides of the calibration vertical beam pattern are asymmetrical.

Described below is a method for aligning a radar of a vehicle according to an embodiment of the present disclosure, capable of enhancing accuracy of vertical angle estimation of a radar mounted to a vehicle even when left and right sides of a calibration vertical beam pattern are asymmetrical.

Figure 7:
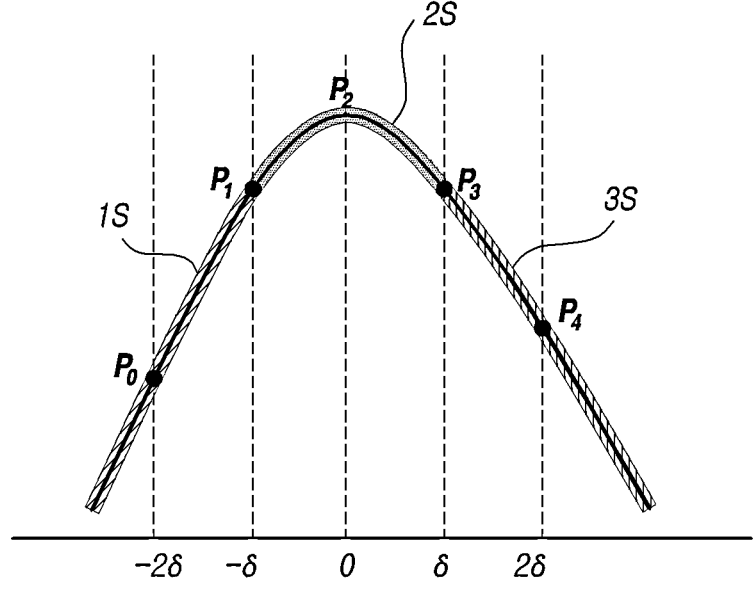
FIG. 7 is a graph for illustrating an example of a calibration vertical beam pattern in a method for aligning a radar of a vehicle according to an embodiment of the present disclosure.

FIG. 7 is a graph for illustrating an example of a calibration vertical beam pattern in a method for aligning a radar of a vehicle according to an embodiment of the present disclosure.

Referring to FIG. 7, an example of the calibration vertical beam pattern may have a left vertical beam pattern and a right vertical beam pattern asymmetric with each other with respect to the radar vertical angle of 0°. The asymmetry of the calibration vertical beam pattern may be due to a hardware error or mechanical defect in the design process of the radar as described above, but is not limited thereto.

The calibration vertical beam pattern may mean the intensity of the reflection signal based on the radar before mounted to the vehicle, indicated for each vertical orientation. As described above, the calibration vertical beam pattern may be obtained by a radar before mounted to the vehicle for the corner reflector.

An intensity $P_1$ at an angle –$\delta$° as the radar vertical angle and an intensity $P_3$ at an angle $\delta$° are measured to have different intensities, and an intensity $P_0$ at an angle –$2\delta$° and an intensity $P_4$ at an angle $2\delta$° are also measured to have different intensities, so that a calibration vertical beam pattern in which the left and right sides are asymmetrical with respect to the vertical angle 0° of the radar may be obtained.

However, the difference between the intensities $P_1$ and $P_3$ may be smaller than the difference between the intensities $P_0$ and $P_4$. Accordingly, in the calibration vertical beam pattern used to estimate the vertical angle of the radar mounted to the vehicle, the difference between the intensity $P_1$ at the angle –$\delta$° and the intensity $P_3$ at the angle $\delta$° does not significantly affect the calibration vertical beam pattern, but the difference between the intensity $P_0$ at the angle –$2\delta$° and the intensity $P_4$ at the angle $2\delta$° is large and may significantly affect the calibration vertical beam pattern.

The method for aligning the radar of the vehicle according to an embodiment of the present disclosure may estimate the vertical angle of the radar mounted to the vehicle in consideration of asymmetry of the calibration vertical beam pattern.

Specifically, in the asymmetric calibration vertical beam pattern, a first section 1S, a second section 2S, and a third section 3S may be preset. For example, a portion of the left vertical beam pattern and a portion to the right vertical beam pattern may be set as the second section 2S according to a preset angular range, a remaining portion of the left vertical beam pattern may be set as the first section 1S, and a remaining portion of the right vertical beam pattern may be set as the third section 3S.

For example, the second section 2S may be set as a portion of the left vertical beam pattern and a portion to the right vertical beam pattern in a preset angular range from –$\delta$° to +$\delta$°, the first section 1S may be set as a remaining portion of the left vertical beam pattern in an angular range less than –$\delta$°, and the third section may be set as a remaining portion of the right vertical beam pattern in an angular range exceeding $\delta$°.

However, it is an example that the preset angular range is –$\delta$° to +$\delta$°, and the present disclosure is not limited thereto. The preset angular range may be set to a narrower range as the asymmetry of the calibration vertical beam pattern increases, and may be set to a wider range as the asymmetry of the calibration vertical beam pattern decreases. In other words, the preset angular range may vary depending on the asymmetry of the left and right sides of the calibration vertical beam pattern.

Each of a first quadratic equation for the first section 1S, a second quadratic equation for the second section 2S, and a third quadratic equation for the third section 3S may be estimated according to preset sections.

For example, the first quadratic equation for the first section 1S may be estimated with Equation 3 below, the second quadratic equation for the second section 2S may be estimated with Equation 4 below, and the third quadratic equation for the third section 3S may be estimated with Equation 5 below.

$$y_-(x) = a_- x^2 + c_-$$ [Equation 3]

$$y_0(x) = a_0 x^2 + c_0$$ [Equation 4]

$$y_+(x) = a_+ x^2 + c_+$$ [Equation 5]

Since the left side and the right side of the calibration vertical beam pattern are asymmetric but the maximum intensities are the same as $P_2$, $c_-$ in Equation 3, $c_0$ in Equation 4, and $c_+$ in Equation 5 are all the same as $P_2$.

The first coefficient, the second coefficient, and the third coefficient may be calculated based on the estimated first quadratic equation, the second quadratic equation, and the third quadratic equation, respectively.

For example, the quadratic term coefficient ($a_-$) of the first quadratic equation may be calculated as the first coefficient, the quadratic term coefficient ($a_0$) of the second quadratic equation may be calculated as the second coefficient, and the quadratic term coefficient ($a_+$) of the third quadratic equation may be calculated as the third coefficient.

The quadratic term coefficient $(a_-)$ of the first quadratic equation calculated as the first coefficient may be calculated with Equation 6 below by substituting $(-2\delta, P_0)$ and $(-\delta, P_1)$ into Equation 3.

$$a_- = \frac{P_0 + P_1 - 2P_2}{5\delta^2} \text{ or } a_- = \frac{P_0 - P_1}{3\delta^2} \qquad \text{[Equation 6]}$$

In Equation 6, $a_-$ on the left and $a_-$ on the right are expressed differently but are substantially the same value.

The quadratic coefficient $(a_0)$ of the second quadratic equation calculated as the second coefficient may be calculated with Equation 7 below by substituting $(-\delta, P_1)$ and $(\delta, P_3)$ into Equation 4.

$$a_0 = \frac{P_1 + P_3 - 2P_2}{2\delta^2} \qquad \text{[Equation 7]}$$

The quadratic term coefficient $(a_+)$ of the third quadratic equation calculated as the third coefficient may be calculated with Equation 8 below by substituting $(\delta, P_3)$ and $(2\delta, P_4)$ into Equation 5.

$$a_+ = \frac{P_3 + P_4 - 2P_2}{5\delta^2} \text{ or } a_+ = \frac{P_4 - P_3}{3\delta^2} \qquad \text{[Equation 8]}$$

In Equation 8, $a_+$ on the left and $a_+$ on the right are expressed differently but are substantially the same value.

One of the calculated first coefficient $(a_-)$, second coefficient $(a_0)$, and third coefficient $(a_+)$ may be selected based on the first intensity $(\beta_{+\theta})$ extracted from the second reflection signal and the second intensity $(\beta_{-\theta})$ extracted from the third reflection signal.

Referring back to FIG. 6, one of the first to third coefficients $a_-$, $a_0$, and $a_+$ may be selected based on a result of comparing a reference value preset based on a positive number equal to or less than 1 and a difference between the first intensity $\beta_{+\theta}$ and the second intensity $\beta_{-\theta}$.

$\gamma$ may be a positive number of 1 or less. $\gamma$ may be set to a value closer to 0 as the left-right asymmetry of the calibration vertical beam pattern increases, and be set to a value closer to 1 as the left-right asymmetry of the calibration vertical beam pattern decreases.

For example, when the difference between the first intensity $\beta_{+\theta}$ and the second intensity $\beta_{-\theta}$ is less than $-\gamma$ which is the reference value, the first coefficient $a_-$ may be selected from among the first to third coefficients $a_-$, $a_0$, and $a_+$. For example, if $(\beta_\theta - \beta_{-\theta}) < -\gamma$, the first coefficient $(a_-)$ may be selected.

As another example, when the absolute value of the difference between the first intensity $\beta_{+\theta}$ and the second intensity $\beta_{-\theta}$ is equal to or less than $-\gamma$ which is the reference value, the second coefficient $a_0$ may be selected from among the first to third coefficients $a_-$, $a_0$, and $a_+$. For example, if $|\beta_\theta - \beta_{-\theta}| \leq \gamma$, the second coefficient $(a_0)$ may be selected.

As another example, when the difference between the first intensity $\beta_{+\theta}$ and the second intensity $\beta_{-\theta}$ exceeds $\gamma$ which is the reference value, the third coefficient $a_+$ may be selected from among the first to third coefficients $a_-$, $a_0$, and $a_+$. For example, if $(\beta_\theta - \beta_{-\theta}) > \gamma$, the third coefficient $(a_+)$ may be selected.

The coefficient selected from among the first to third coefficients $a_-$, $a_0$, and $a_+$ may be substituted into a of Equation 2 described above, and the vertical angle $\alpha$ of the radar mounted to the vehicle may be estimated. Accordingly, the vertical angle $\alpha$ of the radar mounted to the vehicle is calculated based on one coefficient selected from among the first to third coefficients $a_-$, $a_0$, and $a_+$ that are not the same, and thus may be calculated differently according to the selected coefficient. In other words, since the first to third coefficients $a_-$, $a_0$, and $a_+$ are values calculated in consideration of asymmetry of the calibration vertical beam pattern of the radar, estimation accuracy of the vertical angle $\alpha$ of the radar mounted to the vehicle may be enhanced even when the calibration vertical beam pattern of the radar is asymmetric.

Figure 8:
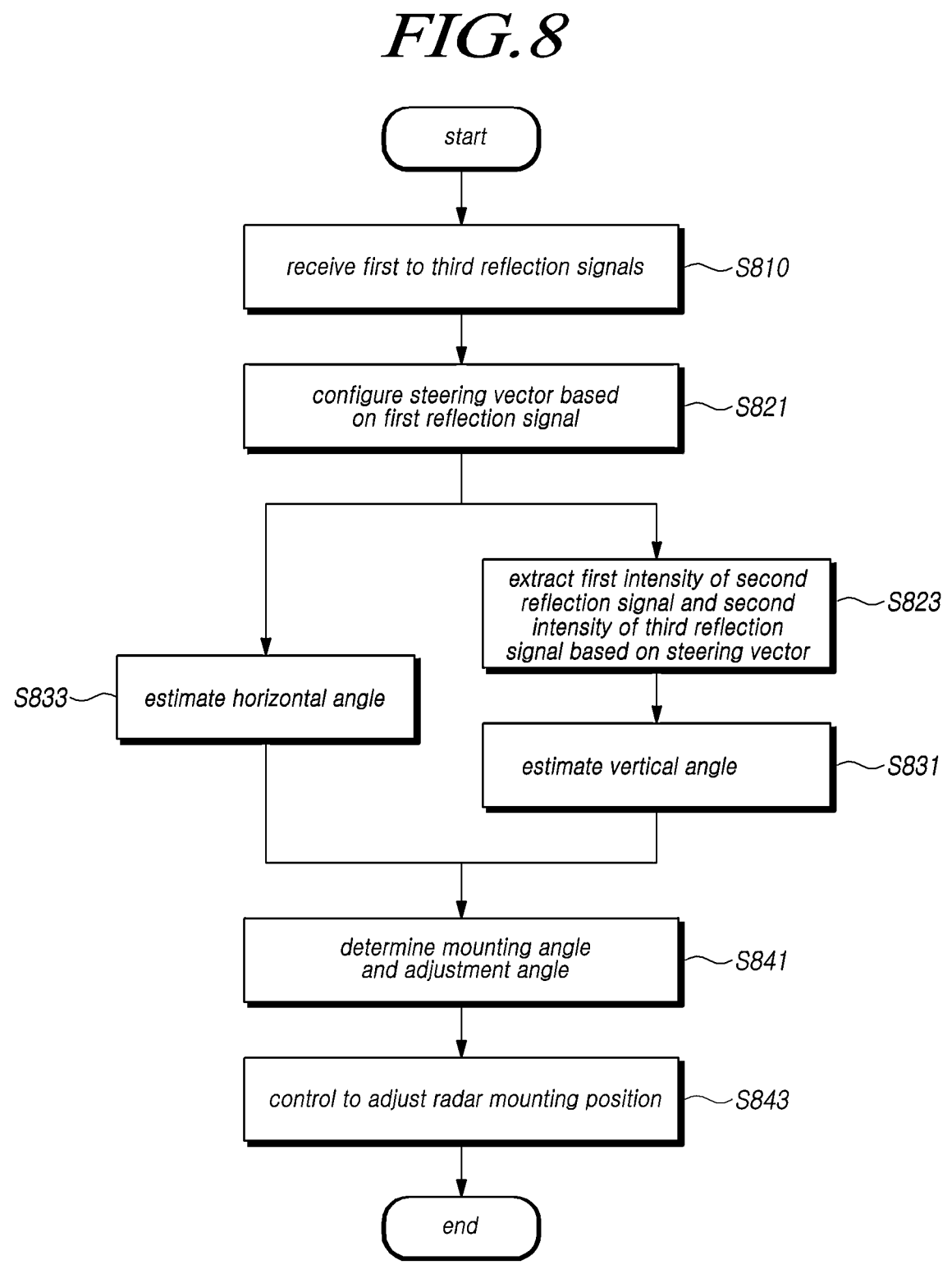

FIG. 8 is a flowchart illustrating a method for aligning a radar of a vehicle according to an embodiment of the present disclosure.

Referring to FIG. 8, as described above, the method for aligning the radar of the vehicle according to an embodiment of the present disclosure may receive the first reflection signal for the state in which the vertical angle of the test target is aligned at a reference angle (e.g. 0°), the second reflection signal for the state in which the vertical angle of the test target is tilted at $-\theta°$ with respect to the radar mounted to the vehicle, and the third reflection signal for the state in which the vertical angle of the test target is tilted at $+\theta°$ with respect to the radar mounted to the vehicle (step S810), determine the steering vector based on the first reflection signal (step S821), extract the first intensity in the second reflection signal and the second intensity in the third reflection signal based on the steering vector (step S823), and estimate the vertical angle of the radar mounted to the vehicle based on the preset first section, second section, and third section of the calibration vertical beam pattern and the extracted first intensity and second intensity (step S831).

In the meanwhile, the method for aligning the radar of the vehicle according to an embodiment of the present disclosure may estimate the horizontal angle of the radar mounted to the vehicle based on the steering vector (step S833).

Then, the method for aligning the radar of the vehicle according to an embodiment of the present disclosure may determine a mounting angle of the radar mounted to the vehicle based on the vertical angle estimated at step S831 and the horizontal angle estimated at step S833 and determine an adjustment angle for zeroing based on the mounting angle (step S841), and control to adjust a position or angle of the radar mounted to the vehicle according to the adjustment angle (step S843).

The above-described method for aligning the radar of the vehicle according to an embodiment of the present disclosure may perform precise alignment of the radar mounted to the vehicle by enhancing the accuracy of determination of the mounting angle of the radar for aligning the radar mounted to the vehicle, in particular, vertical angle estimation.

The above-described method for aligning the radar of the vehicle according to an embodiment of the present disclosure may enhance the accuracy of vertical angle estimation of the radar mounted to the vehicle even when the vertical beam pattern of the radar is asymmetric to a left and/or right due to a hardware error or mechanical defect in the process of designing the radar.

A device for aligning a radar of a vehicle, capable of performing the embodiments of the method for aligning the radar of the vehicle described with reference to FIGS. 1 to 8 is described below. The device for aligning the radar of the vehicle described below may perform all or some above-described operations of the embodiments of the method for aligning the radar of the vehicle. Further, the device for aligning the radar of the vehicle may perform any combination of some or all of the above-described operations of the embodiments of the method for aligning the radar of the vehicle.

Figure 9:
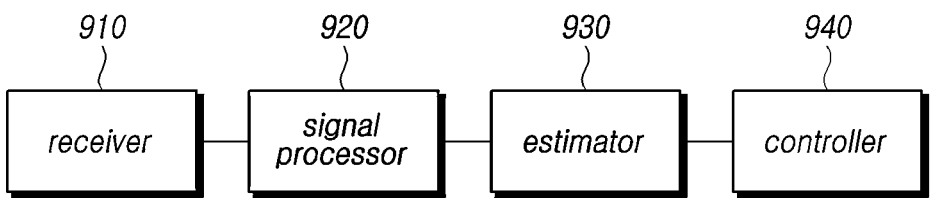
FIG. 9 is a block diagram for illustrating a device for aligning a radar of a vehicle according to an embodiment of the present disclosure.

FIG. 9 is a block diagram for illustrating a device for aligning a radar of a vehicle according to an embodiment of the present disclosure.

Referring to FIG. 9, a device for aligning a radar of a vehicle according to an embodiment of the present disclosure may include a receiver 910 configured to receive a first reflection signal for a state in which a vertical angle of a test target is aligned at a reference angle (e.g. 0°), a second reflection signal for a state in which the vertical angle of the test target is tilted at a predetermined negative angle (e.g. −θ°), and a three reflection signal for a state in which the vertical angle of the test target is tilted at a predetermined positive angle (e.g. +θ°), based on the radar mounted to the vehicle.

The radar may be mounted to the vehicle. The radar may be mounted inside or on the vehicle to face forward of the vehicle. However, the mounting position of the radar is not limited to the front, and may further include a left side radar, a right side radar, and a rear side radar in addition to the front radar.

The radar may transmit a generated signal to the outside of the vehicle and receive a reflected signal which is the transmitted signal reflected by a target. The radar may detect a distance to the target by analyzing a time from the transmission of the radar signal to the receipt of the radar signal reflected by the target and returned and a change in the signal waveform. The radar may be implemented as, for instance, a frequency modulation continuous wave radio detection and ranging (FMCW) radar, but is not limited thereto. In other words, the radar may include any information system that detects the target by measuring the reflected signal of the electromagnetic wave which is reflected by the target and returns to the radar and determines, for example, but not limited to, a direction, distance, and velocity of the signal, regardless of the format of the transmitted signal.

Further, the radar may generate a map for the detected ambient targets as well as distance detection. The map may indicate positions of targets around the vehicle, changes in the positions of the targets, and the like. The target may be a dynamic object or a static object. For example, the dynamic object may be another vehicle, a bicycle, a motorcycle, a person, or the like, that is moving around the host vehicle, and the static object may be another vehicle, a bicycle, or a motorcycle that is parked around the host vehicle or a person that is not moving, a guardrail, a traffic light, or the like.

The radar may include a plurality of antennas. For example, the radar may include at least one transmission antenna and a plurality of reception antennas corresponding to a plurality of reception channels. The reflection signals received through the reception channels may have different phases depending on the reception directions, and the reception antennas may have different directional angles.

The test target may be provided in front of the radar mounted to the vehicle. The test target may be provided with a tilting device of the test target, and the vertical angle of the test target may be varied by the tilting device. The vertical angle of the test target may mean an angle formed by a normal perpendicular to the ground and a reflective surface of the test target.

For example, the state in which the test target is aligned at a reference angle (e.g. a vertical angle of 0°) may mean a case in which the reflective surface of the test target is parallel to a normal perpendicular to the ground. The state in which the test target is tilted at a predetermined negative angle (e.g. a vertical angle −θ°) may mean a case in which the reflective surface of the test target is tilted counterclockwise to θ° with respect to the normal perpendicular to the ground. The state in which the test target is tilted at a predetermined positive angle (e.g. a vertical angle +θ°) may mean a case in which the reflective surface of the test target is tilted at θ° clockwise with respect to the normal perpendicular to the ground.

The test target may have a flat reflector. Since the flat plate reflector reflects the incident signal in the opposite direction of the same angle as the incident angle, the radar may receive only the reflection signal that is incident perpendicular to the flat plate reflector.

In other words, the receiver 910 may receive each of the first reflection signal that is vertically incident and reflected with respect to the state in which the vertical angle of the test target is aligned at 0°, the second reflection signal that is vertically incident and reflected with respect to the state in which the test target 30 is tilted at −θ°, and the third reflection signal that is vertically incident and reflected with respect to the state in which the test target 30 is tilted at +θ°, based on the radar mounted to the vehicle.

Referring to FIG. 9, the device for aligning the radar of the vehicle according to an embodiment of the present disclosure may include a signal processor 920 configured to determine a steering vector based on the first reflection signal and extracting a first intensity from the second reflection signal and a second intensity from the third reflection signal based on the steering vector.

The signal processor 920 may determine the steering vector based on the first reflection signal.

For example, the steering vector may be determined based on the first reflection signal for the state in which the vertical angle of the test target is aligned at 0° based on the radar mounted to the vehicle. The steering vector may be determined by producing or calculating a difference between the phases of the first reflection signals received through the reception antennas of the radar and a reference phase. The reference phase may be, for example, but not limited to, a phase preset for a central antenna among the reception antennas of the radar, or a phase preset for any one antenna other than the central antenna among the reception antennas of the radar. The steering vector may be determined as phase values corresponding to the reception antennas included in the radar.

The steering vector may include information about the horizontal angle of the radar. In other words, the steering vector may include horizontal angle information due to an alignment error of the radar in the horizontal direction. Accordingly, the steering vector may be used to estimate the horizontal angle of the radar to be described below, and may be also used to estimate the vertical angle to enhance the accuracy of the vertical angle estimation.

The signal processor 920 may extract the first intensity from the second reflection signal and the second intensity from the third reflection signal based on the steering vector.

For example, the signal processor 920 may extract the first intensity of the maximum point by calculating the second reflection signal for the state in which the vertical angle between the steering vector and the test target is tilted at −θ°. Also, the signal processor 920 may extract the second intensity of the maximum point by calculating the third reflection signal for the state in which the vertical angle between the steering vector and the test target is tilted at +θ°.

As described above, since the steering vector includes information about the horizontal angle of the radar, the converted second reflection signal and the converted third reflection signal for the case where there is no error in the horizontal angle of the radar may be produced through calculation with the steering vector for each of the second reflection signal and the third reflection signal, and the first intensity and the second intensity may be extracted based on the converted second reflection signal and the converted third reflection signal, respectively. Accordingly, since the first intensity and the second intensity are used to estimate the vertical angle of the radar mounted to the vehicle without influence by the horizontal angle error, the accuracy of estimating the vertical angle of the radar mounted to the vehicle may be enhanced.

Referring to FIG. 9, the device for aligning the radar of the vehicle according to an embodiment of the present disclosure includes an estimator 930 configured to determine or produce a first coefficient, a second coefficient, and a third coefficient based on a first section, a second section, and a third section of a preset calibration vertical beam pattern, select one of the first coefficient, the second coefficient, and the third coefficient based on the first intensity and the second intensity, and estimate a vertical angle of the radar mounted to the vehicle based on the selected coefficient.

The calibration vertical beam pattern may mean the intensity of the reflection signal based on the radar before mounted to the vehicle, indicated for each vertical orientation.

The calibration vertical beam pattern based on the radar before mounted to the vehicle may be obtained using a flat plate reflector. However, the present disclosure is not limited thereto. For example, the calibration vertical beam pattern based on the radar before mounted to the vehicle may be obtained using a corner reflector.

There is a difference in that the flat plate reflector is a surface target and the corner reflector is a point target. Accordingly, the beam pattern shape of the corner reflector may be similar to the beam pattern shape of the flat plate reflector, but there may be a difference in intensity according to the difference in reflected power. According to an embodiment of the present disclosure, the vertical angle of the radar mounted to the vehicle may be estimated without using a factor related to the difference in intensity due to the difference in reflected power. Accordingly, the present embodiments may estimate the vertical angle of the radar mounted to the vehicle based not only on the calibration vertical beam pattern obtained using the flat plate reflector, but also on the calibration vertical beam pattern obtained using the corner reflector.

The calibration vertical beam pattern may have a left vertical beam pattern and a right vertical beam pattern asymmetric with each other with respect to the radar vertical angle of 0°. However, the present embodiments may also be applied to a vertical beam pattern that has a left vertical beam pattern and a right vertical beam pattern symmetrical with each other with respect to the radar vertical angle of 0°.

In the calibration vertical beam pattern, a first section, a second section, and a third section may be preset. For example, a portion of the left vertical beam pattern and a portion to the right vertical beam pattern may be set as the second section according to a preset angular range, a remaining portion of the left vertical beam pattern may be set as the first section, and a remaining portion of the right vertical beam pattern may be set as the third section.

The preset angular range may be set to be different depending on the asymmetry of the calibration vertical beam pattern. For example, the preset angular range may be set to a narrower range as the asymmetry of the calibration vertical beam pattern increases, and may be set to a wider range as the asymmetry of the calibration vertical beam pattern decreases.

The estimator 930 may produce a first coefficient, a second coefficient, and a third coefficient based on the first section, the second section, and the third section of the preset calibration vertical beam pattern. For example, the estimator 930 may estimate each of a first quadratic equation for the first section, a second quadratic equation for the second section, and a third quadratic equation for the third section. In this case, a quadratic term coefficient of the first quadratic equation may be produced as the first coefficient, a quadratic term coefficient of the second quadratic equation may be produced as the second coefficient, and a quadratic term coefficient of the third quadratic equation may be produced as the third coefficient.

Further, the estimator 930 may select one of the first to third coefficients based on the first intensity and the second intensity extracted by the signal processor 920. For example, the estimator 930 may select one of the first to third coefficients based on a result of comparing a reference value preset based on a positive value $\gamma$ and a difference between the first intensity and the second intensity.

For example, the estimator 930 may select the first coefficient from among the first to third coefficients when the difference between the first intensity and the second intensity is less than a reference value $-\gamma$. As another example, the estimator 930 may select the second coefficient from among the first to third coefficients when an absolute value of the difference between the first intensity and the second intensity is a reference value $\gamma$ or less. As another example, the estimator 930 may select the third coefficient from among the first to third coefficients when the difference between the first intensity and the second intensity exceeds the reference value $\gamma$.

The estimator 930 may estimate the vertical angle of the radar mounted to the vehicle based on the selected coefficient. In other words, the estimator 930 may estimate the vertical angle of the radar mounted to the vehicle as different depending on the selected coefficient.

Further, the estimator 930 may estimate a horizontal angle of the radar mounted to the vehicle based on the steering vector determined by the signal processor 920. For example, the estimator 930 may estimate the horizontal angle of the radar mounted to the vehicle by comparing the determined steering vector with a preset reference steering vector. However, the horizontal angle of the radar mounted to the vehicle may be estimated based on a conventional technique of estimating the steering vector.

Referring to FIG. 9, the device for aligning the radar of the vehicle according to an embodiment of the present disclosure may further include a controller 940 configured to determine a mounting angle of the radar mounted to the vehicle based on the vertical angle and the horizontal angle estimated by the estimator 930, determine an adjustment angle for zeroing based on the mounting angle, and control to adjust a position of the radar mounted to the vehicle according to the adjustment angle.

The controller 940 may control the position or angle of the radar mounted to the vehicle to be adjusted by operating the motor operably connected to the radar for adjusting the mounting angle in which the radar is mounted according to the adjustment angle for zeroing. However, the controller 940 may output a command or message for the adjustment angle for zeroing, allowing the radar mounted to the vehicle to be repositioned.

The device for aligning the radar of the vehicle according to an embodiment of the present disclosure may perform precise alignment of a radar mounted to a vehicle by enhancing the accuracy of determination of the mounting angle for aligning the radar mounted to the vehicle, in particular, vertical angle estimation.

The device for aligning the radar of the vehicle according to an embodiment of the present disclosure may enhance the accuracy of vertical angle estimation of a radar mounted to a vehicle even when the vertical beam pattern of the radar is asymmetric to a left and/or right due to a hardware error or mechanical defect in the process of designing the radar.

According to an embodiment of the present disclosure, the device for aligning the radar of the vehicle or one or more components of the device for aligning the radar of the vehicle may be implemented as, for example, but not limited to, an electronic control unit (ECU).

For instance, the ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that is capable of executing processing instructions stored in the memory and/or the storage unit. The memory and the storage unit may include various types of volatile/non-volatile storage media. For example, the memory may include a read only memory (ROM) and a random access memory (RAM).

Specifically, the device for aligning the radar of the vehicle and the receiver 910, signal processor 920, estimator 930, and controller 940 included therein according to an embodiment of the present disclosure may be implemented as some modules of a control device or ECU of a radar system installed in the vehicle.

The control device or ECU of the radar system may include a processor, a storage device, such as memory, and a computer program capable of performing specific functions, and the above-described receiver 910, signal processor 920, estimator 930, and controller 940 may be implemented as software modules capable of performing their respective corresponding functions.

In other words, the receiver 910, the signal processor 920, the estimator 930, and the controller 940 according to some embodiments of the present disclosure may be implemented as their respective corresponding software modules which are then stored in the memory, and each software module may be performed by a computation processing device, such as the ECU included in the system of the vehicle, at a specific time.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A method of aligning a radar of a vehicle, the method comprising:

determining a steering vector based on a first reflection signal for a state in which a vertical angle of a test target is aligned at a reference angle;

extracting a first intensity from a second reflection signal for a state in which the vertical angle of the test target is tilted at a predetermined negative angle and a second intensity from a third reflection signal for a state in which the vertical angle of the test target is tilted at a predetermined positive angle, based on the steering vector determined based on the first reflection signal; and determining a first coefficient based on a first section of a calibration vertical beam pattern, a second coefficient based on a second section of the calibration vertical beam pattern, and a third coefficient based on a third section of the calibration vertical beam pattern, selecting one of the first coefficient, the second coefficient, and the third coefficient based on the first intensity and the second intensity, and estimating a vertical angle of the radar mounted to the vehicle based on the selected one of the first coefficient, the second coefficient, and the third coefficient.

2. The method of claim 1, wherein the calibration vertical beam pattern has a left vertical beam pattern and a right vertical beam pattern which are asymmetric with each other with respect to a reference vertical angle of the radar.

3. The method of claim 2, wherein a portion of the left vertical beam pattern and a portion of the right vertical beam pattern are set as the second section of the calibration vertical beam pattern according to a preset angular range, a remaining portion of the left vertical beam pattern is set as the first section of the calibration vertical beam pattern, and a remaining portion of the right vertical beam pattern is set as the third section of the calibration vertical beam pattern.

4. The method of claim 3, wherein:

the determining of the first coefficient, the second coefficient, and the third coefficient comprises estimating a first quadratic equation for the first section of the calibration vertical beam pattern, a second quadratic equation for the second section of the calibration vertical beam pattern, and a third quadratic equation for the third section of the calibration vertical beam pattern, and a quadratic term coefficient of the first quadratic equation is determined as the first coefficient, a quadratic term coefficient of the second quadratic equation is determined as the second coefficient, and a quadratic term coefficient of the third quadratic equation is determined as the third coefficient.

5. The method of claim 1, wherein, in the selecting one of the first coefficient, the second coefficient, and the third coefficient, the selected one of the first coefficient, the second coefficient, and the third coefficient is selected by comparing a difference between the first intensity and the second intensity with a preset reference value.

6. The method of claim 5, wherein the selecting one of of the first coefficient, the second coefficient, and the third coefficient comprises selecting the first coefficient from among the first coefficient, the second coefficient, and the third coefficient when the difference between the first intensity and the second intensity is less than the preset reference value.

7. The method of claim 5, wherein the selecting one of the first coefficient, the second coefficient, and the third coefficient comprises selecting the second coefficient from among the first coefficient, the second coefficient, and the third coefficient when an absolute value of the difference between the first intensity and the second intensity is equal to or less than the preset reference value.

8. The method of claim 5, wherein the selecting one of the first coefficient, the second coefficient, and the third coefficient comprises selecting the third coefficient from among the first coefficient, the second coefficient, and the third coefficient when the difference between the first intensity and the second intensity is greater than the preset reference value.

9. The method of claim 1 further comprising:
estimating a horizontal angle of the radar mounted to the vehicle based on the steering vector determined based on the first reflection signal for the state in which the vertical angle of the test target is aligned at the reference angle.

10. The method of claim 9, further comprising determining a mounting angle of the radar mounted to the vehicle based on the estimated vertical angle and the estimated horizontal angle of the radar, determining an adjustment angle for a zero point adjustment of the radar based on the determined mounting angle of the radar, and controlling to adjust a position of the radar mounted to the vehicle according to the adjustment angle for the zero point adjustment of the radar.

11. A device for aligning a radar of a vehicle, the device comprising:
a receiver configured to receive a first reflection signal, a second reflection signal, and a third reflection signal; and
one or more processors configured to:
determine a steering vector based on the first reflection signal for a state in which a vertical angle of a test target is aligned at a reference angle;
extract a first intensity from the second reflection signal for a state in which the vertical angle of the test target is tilted at a predetermined negative angle and a second intensity from the third reflection signal for a state in which the vertical angle of the test target is tilted at a predetermined positive angle, based on the steering vector determined based on the first reflection signal; and
determine a first coefficient based on a first section of a calibration vertical beam pattern, a second coefficient based on a second section of the calibration vertical beam pattern, and a third coefficient based on a third section of the calibration vertical beam pattern, select one of the first coefficient, the second coefficient, and the third coefficient based on the first intensity and the second intensity, and estimate a vertical angle of the radar mounted to the vehicle based on the selected one of the first coefficient, the second coefficient, and the third coefficient.

12. The device of claim 11, wherein the calibration vertical beam pattern has a left vertical beam pattern and a right vertical beam pattern which are asymmetric with each other with respect to a reference vertical angle of the radar.

13. The device of claim 12, wherein a portion of the left vertical beam pattern and a portion of the right vertical beam pattern are set as the second section of the calibration vertical beam pattern according to a preset angular range, a remaining portion of the left vertical beam pattern is set as the first section of the calibration vertical beam pattern, and a remaining portion of the right vertical beam pattern is set as the third section of the calibration vertical beam pattern.

14. The device of claim 13, wherein:
the one or more processors are configured to estimate a first quadratic equation for the first section of the calibration vertical beam pattern, a second quadratic equation for the second section of the calibration vertical beam pattern, and a third quadratic equation for the third section of the calibration vertical beam pattern, and
a quadratic term coefficient of the first quadratic equation is determined as the first coefficient, a quadratic term coefficient of the second quadratic equation is determined as the second coefficient, and a quadratic term coefficient of the third quadratic equation is determined as the third coefficient.

15. The device of claim 11, wherein the one or more processors are configured to select one of the first coefficient, the second coefficient, and third coefficient by comparing a difference between the first intensity and the second intensity with a preset reference value.

16. The device of claim 15, wherein the one or more processors are configured to select the first coefficient from among the first coefficient, the second coefficient, and the third coefficient when the difference between the first intensity and the second intensity is less than the preset reference value.

17. The device of claim 15, wherein the one or more processors are configured to select the second coefficient from among the first coefficient, the second coefficient, and the third coefficient when an absolute value of the difference between the first intensity and the second intensity is equal to or less than the preset reference value.

18. The device of claim 15, wherein the one or more processors are configured to select the third coefficient from among the first coefficient, the second coefficient, and the third coefficient when the difference between the first intensity and the second intensity is greater than the preset reference value.

19. The device of claim 11, wherein the one or more processors are configured to estimate a horizontal angle of the radar mounted to the vehicle based on the steering vector determined based on the first reflection signal for the state in which the vertical angle of the test target is aligned at the reference angle.

20. The device of claim 19, further comprising a controller configured to determine a mounting angle of the radar mounted to the vehicle based on the estimated vertical angle and the estimated horizontal angle of the radar, determine an adjustment angle for a zero point adjustment of the radar based on the determined mounting angle of the radar, and control to adjust a position of the radar mounted to the vehicle according to the adjustment angle for the zero point adjustment of the radar.

* * * * *